United States Patent [19]

Mannava et al.

[11] Patent Number: 4,525,068
[45] Date of Patent: Jun. 25, 1985

[54] TORQUE MEASUREMENT METHOD AND APPARATUS

[75] Inventors: Seetha R. Mannava, Latham; Joseph W. Erkes, Menands, both of N.Y.

[73] Assignee: General Electric Company, Schenectady, N.Y.

[21] Appl. No.: 419,241

[22] Filed: Sep. 17, 1982

[51] Int. Cl.³ .............................. G01P 3/36; G01L 3/12
[52] U.S. Cl. .................................. 356/35.5; 356/28.5; 356/349; 73/862.34
[58] Field of Search .................... 356/35.5, 349, 28.5; 73/862.34; 350/162.23

[56] References Cited

U.S. PATENT DOCUMENTS

| | | | |
|---|---|---|---|
| 2,586,540 | 2/1952 | Holden | 73/862.34 |
| 3,419,330 | 12/1968 | Schneider | 350/162.23 |
| 3,604,804 | 9/1971 | Penney | 356/28 |
| 4,347,748 | 9/1982 | Pierson | 73/862.34 |

Primary Examiner—Vincent P. McGraw
Assistant Examiner—S. A. Turner
Attorney, Agent, or Firm—John F. Ahern

[57] ABSTRACT

When a torque is transmitted through a body, the body tends to twist in proportion to the torque and to the characteristics of the material. Doppler measurements made at points separated from each other on a body differ slightly due to the applied torque by the reduced motion of the body at points closer to the load. The Doppler from the two points is accumulated to thereby maintain a record of the twist and thereby the torque in the body.

12 Claims, 4 Drawing Figures

TORQUE MEASUREMENT METHOD AND APPARATUS

BACKGROUND OF THE INVENTION

The present invention relates to method and apparatus for measuring, without contact, the torque being applied from a source through an object to a load. More particularly, the invention relates to a sensing apparatus and method for measuring surface velocities at two points on the object transmitting the torque with sufficient precision to determine the twist experienced by the object from the difference in the measured velocities and thus the torque being transmitted.

Non-conducting sensors are desirable in industrial applications where noise, vibration, dirt and physical abuse make employment of contact sensors undesirable.

U.S. Pat. No. 3,604,804 issued to Carl M. Penney and Henry Hurwitz, Jr. on Sept. 14, 1971, discloses a method of measuring surface tangential velocity of a diffusely reflecting surface by measuring the Doppler frequency resulting from motion of speckles in the diffusely reflected light. A laser beam is divided into two separated beams which are then directed together so that they impinge on the same point on the surface. Due to the differing angles of arrival of the two beams at the surface, motion of the surface parallel to a plane defined by the two beams produces different Doppler frequencies. The Doppler produced by each beam is related to the angle of incidence of the incoming beams and the wave length of the light. A detector, sensing the light at the point of impingement can produce a signal which contains the difference between the Doppler frequencies of the two beams.

If it could be done with enough precision, measurement of rotational velocity of a shaft would be interpretable in terms of torsional vibration of the shaft. An electrical fault occurring in the transmission system to which a generator is coupled, resulting from load shedding, short circuits and the like produces extremely high oscillatory torques in the generator rotor. The torque history of such rotors is useful in predicting their expected life and in analyzing the complex relationship that exists between the electrical generation facility and the power transmission portion of the utility system.

OBJECTS AND SUMMARY OF THE INVENTION

Accordingly, an object of the present invention is to provide a non-contacting means wherein a torque in an object can be measured.

Still another object of the present invention is to provide means and methods of measuring the twist and/or torque in a body utilizing coherent radiation scattered from two pairs of beams incident on points on the body separated from each other in the direction of torque transmission. Each of the pairs of beams provides a Doppler signal which can be employed to precisely measure the velocity component at the point of impingement on the object. Taking the difference between the velocity components at the two points provides an indication of the twist in the object produced by the torque. The relationship between twist and the torque producing it is a known constant. Thus, given the measured twist, the torque can be calculated.

Briefly stated, in accordance with one embodiment of the present invention, there is provided an apparatus for measuring twist in a body, the body being subjectable to a torque applied to a first location and the torque being resistable by a load at a second location, comprising first means for measuring a first velocity at a first region on a surface of the body, second means for measuring a second velocity at a second region on a surface of the body, the second region being closer to the load than the first region, and means for accumulating a difference between the first and second velocities, the difference being related to the twist.

In accordance with a further embodiment of the invention, there is provided an apparatus for measuring twist in a substantially cylindrical shaft having an axis, the shaft being subjectable to a torque about the axis at a first and thereof and subjectable to a load resisting the torque at a second end thereof, comprising a first diffraction grating forming a first band about the shaft, a second diffraction grating forming a second band about the shaft, the first and second diffraction gratings having equally spaced parallel lines disposed parallel to the axis, the second diffraction grating being axially spaced a predetermined distance along the shaft from the first diffraction grating, means for forming a first beam of monochromatic light, means for splitting the first beam into second and third spaced apart beams of monochromatic light, means for converging the first and second beams on a single first spot on the first diffraction grating, the second and third beams defining a plane normal to the axis, first means for simultaneously detecting at least one diffraction order from the second beam and at least another diffraction order from the third beam, the first means for simultaneously detecting being effective to produce first cycles of a first Doppler frequency related to motion of the first diffraction grating, means for forming a fourth beam of monochromatic light, means for splitting the fourth beam into fifth and sixth spaced apart beams of monochromatic light, means for converging the fifth and sixth beams on a single second spot on the second diffraction grating, the fifth and sixth beams defining a plane normal to the axis, second means for simultaneously detecting at least the one diffraction order from the fifth beam and the at least another diffraction order from the sixth beam, the second means for simultaneously detecting being effective to produce second cycles of a second Doppler frequency related to motion of the second diffraction grating, and means for accumulating a difference between the first cycles and the second cycles, the difference being related to a twist in the shaft.

According to a still further embodiment of the invention, there is provided a method of measuring a torque applied to a body, comprising measuring a first Doppler frequency derived from motion of a first point on the body, measuring a second Doppler frequency derived from motion of a second point on the body, the second point being spaced from the first point, accumulating a difference between the first and second Doppler frequencies, and interpreting the difference in terms of torque.

According to a still further embodiment of the invention, there is provided a method of measuring a load applied to a first end of a substantially cylindrical shaft having a torque applied to a second end thereof, comprising measuring a first Doppler frequency derived from motion of a surface of the shaft at a first axial position, measuring a second Doppler frequency derived from motion of a surface of the shaft at a second axial position spaced apart from the first axial position, accumulating a difference between the first and second Doppler frequencies, and interpreting the difference in terms of torque.

BRIEF DESCRIPTION OF THE DRAWINGS

The novel features believed characteristic of the present invention are set forth in the appended claims. The invention itself, together with further objects and advantages thereof, may best be understood with reference to the following detailed description, taken in conjunction with the appended drawings, in which:

DETAILED DESCRIPTION OF THE INVENTION

As mentioned in the preceding, a need exists for accurate, sensitive and non-contacting sensors to measure a twist in a body from which a torque applied to the body can be determined.

Prior to the detailed description of the invention, a brief discussion of diffraction is provided to aid in an understanding of the invention.

Diffraction gratings fall into two general classifications, namely transmission types and reflection types. In a transmission diffraction grating, a large number of fine, closely spaced transparent regions are separated by opaque regions. Light incident on a transmission diffraction grating passes through the transparent regions and is diffracted as will be explained. A reflection diffraction grating customarily includes a reflective surface having a large number of closely spaced parallel grooves. The undisturbed reflective surface acts analogously to the openings in the transmission diffraction grating to diffract the incoming light. Theoretically, either a transmission or reflective-type grating could be employed with the present invention. However, in practice, a reflection grating is preferred since such a grating can be applied to the surface of the object. For purposes of illustration in the following, however, it is simpler to describe the principle in connection with a transmission grating.

Figure 1:
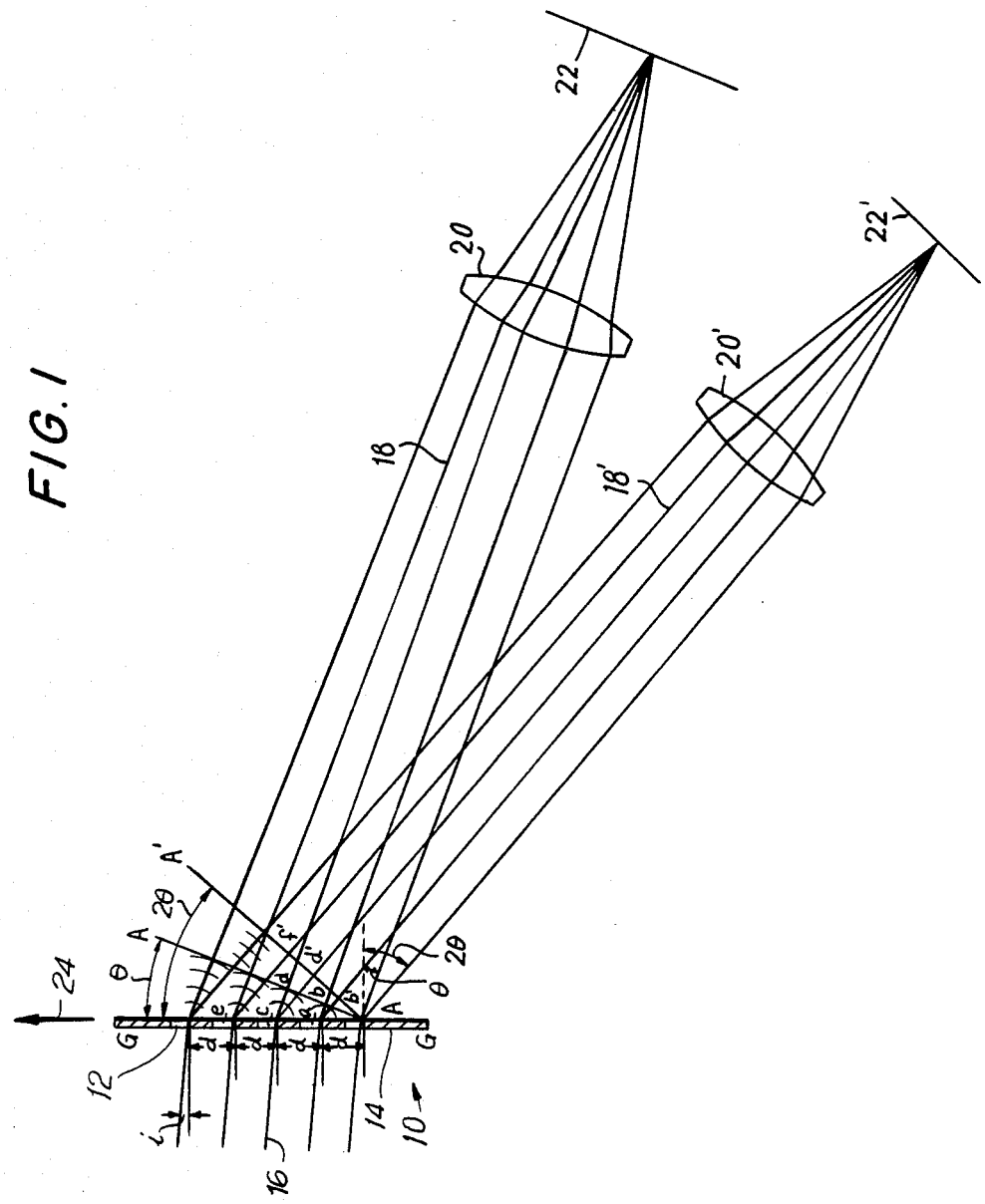
FIG. 1 illustrates a diffraction grating of the transmission type with two of the diffraction or Bragg orders indicated.

Referring to FIG. 1, a diffraction grating 10 of the transmission type includes a plurality of open lines 12 between opaque regions 14. Typically, diffraction grating 10 may be produced photographically on a transparent substrate (not shown) with opaque regions 14 formed by conventional photographic processes or by etching a large number (hundreds or thousands to the inch) of parallel lines in the surface of a glass substrate. Lines 12 are spaced a uniform distance d apart. A plane monochromatic light beam 16, incident on diffraction grating 10, passes through lines 12 and constructively and destructively interferes on the opposite side thereof. At a certain angle $\theta$, identified by line A—A, the light emerging from lines 12 constructively interferes since the distance from each line 12 to line A—A is equal to exactly one wave length of the monochromatic light more or less than the distance from the adjacent line 12. The angle $\theta$ defines the first diffraction order which results in a parallel beam of light 18 which may be focused by a lens 20 on a surface 22. If diffraction grating 10 is stationary, the image on surface 22 has the same frequency and wave length as incoming light beam 16. However, if diffraction grating 10 is in linear motion as shown by an arrow 24, a Doppler shift is seen in the light imaged on surface 22. The Doppler shift is related to the incidence angle, the frequency or wave length of incoming light beam 16 and the speed at which diffraction grating 10 moves. If diffraction grating 10 is of very great extent in a direction normal to lines 12, then the point imaged on surface 22 is stationary but variable in frequency and wave length in proportion to the speed of motion 24. It would be clear that if spacing d is changed, angle $\theta$ is correspondingly changed which results in the image on surface 22 being displaced to a different point.

A further angle at which constructive interference is produced is shown at an angle $2\theta$ indicated by a line A–A'. The path difference of light from each line 12 varies by a factor of two wave lengths from its neighbor. This gives rise to a second diffraction order in a beam 18' which may be focused by a lens 20' on a surface 22'. If diffraction grating 10 is in motion in direction 24, the change in frequency and wave length of the light imaged on surface 22' is twice as great as the change in frequency and wave length of the light imaged on surface 22. That is, the first order Doppler is multiplied by an integer equal to the diffraction order. Third, fourth, and higher orders are also produced with the intensity reducing as the order becomes higher.

In order to produce a signal proportional to the Doppler, incident light 16 may be heterodyned with the Doppler shifted light. Alternatively, a light beam may be split into two portions and both portions directed from different angles at the same point on diffraction grating 10 in such a way that diffraction orders resulting from the two beams may be imaged at a common point.

Figure 2:
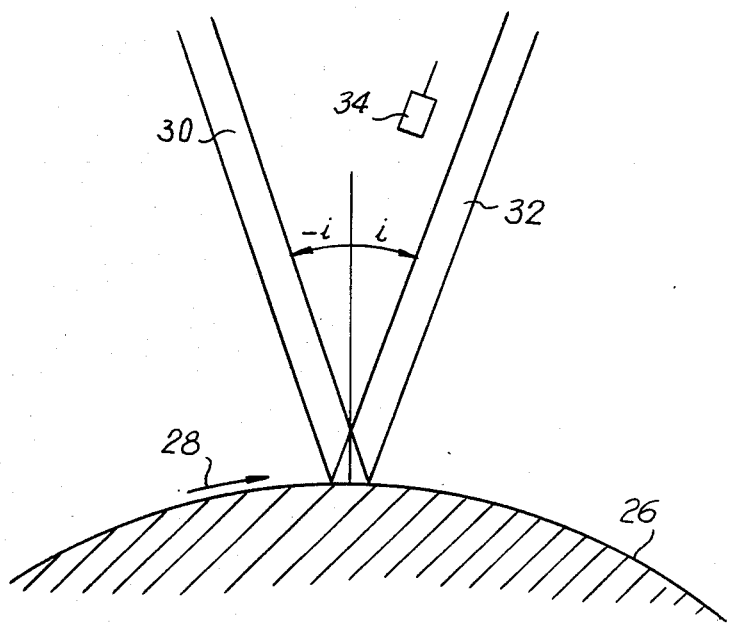
FIG. 2 is a simplified cross sectional view of a shaft upon which two laser beams are impinged to which reference will be made in explaining the invention.

Referring now to FIG. 2, a cylindrical surface 26 such as, for example, the surface of a shaft includes a diffraction grating of the reflective type thereon with the lines parallel to the axis of the shaft. Surface 26 may be in motion as indicated by an arrow 28. A first monochromatic parallel beam 30 is incident on surface 26 at an angle $-i$ from a normal to surface 26. A second beam of monochromatic light 32 is incident from an angle $+i$ upon the same point on surface 26. When thus arranged, the zero diffraction order of each of beams 30 and 32 can be found along the axis of the other beam. Within the angle defined by $\pm i$, the diffraction orders produced by each of beams 30 and 32 have the opposite sign. That is, the Doppler produced by beam 30 is negative, that is, has a lower frequency than incident beam 30 whereas the Doppler produced by beam 32 is positive, that is, has a higher frequency than incident beam 32. Thus, a detector 34 properly positioned to intercept a diffraction order from each of the beams 30 and 32 diffracted by diffraction grating on surface 26 will see a Doppler component which is a multiple of the sum of the diffraction orders. That is, if the diffraction order from beam 30 is $-1$ and the diffraction order from beam 32 is $+4$, the Doppler frequency which may be detected by detector 34 is five times the first order Doppler frequency.

Figure 3:
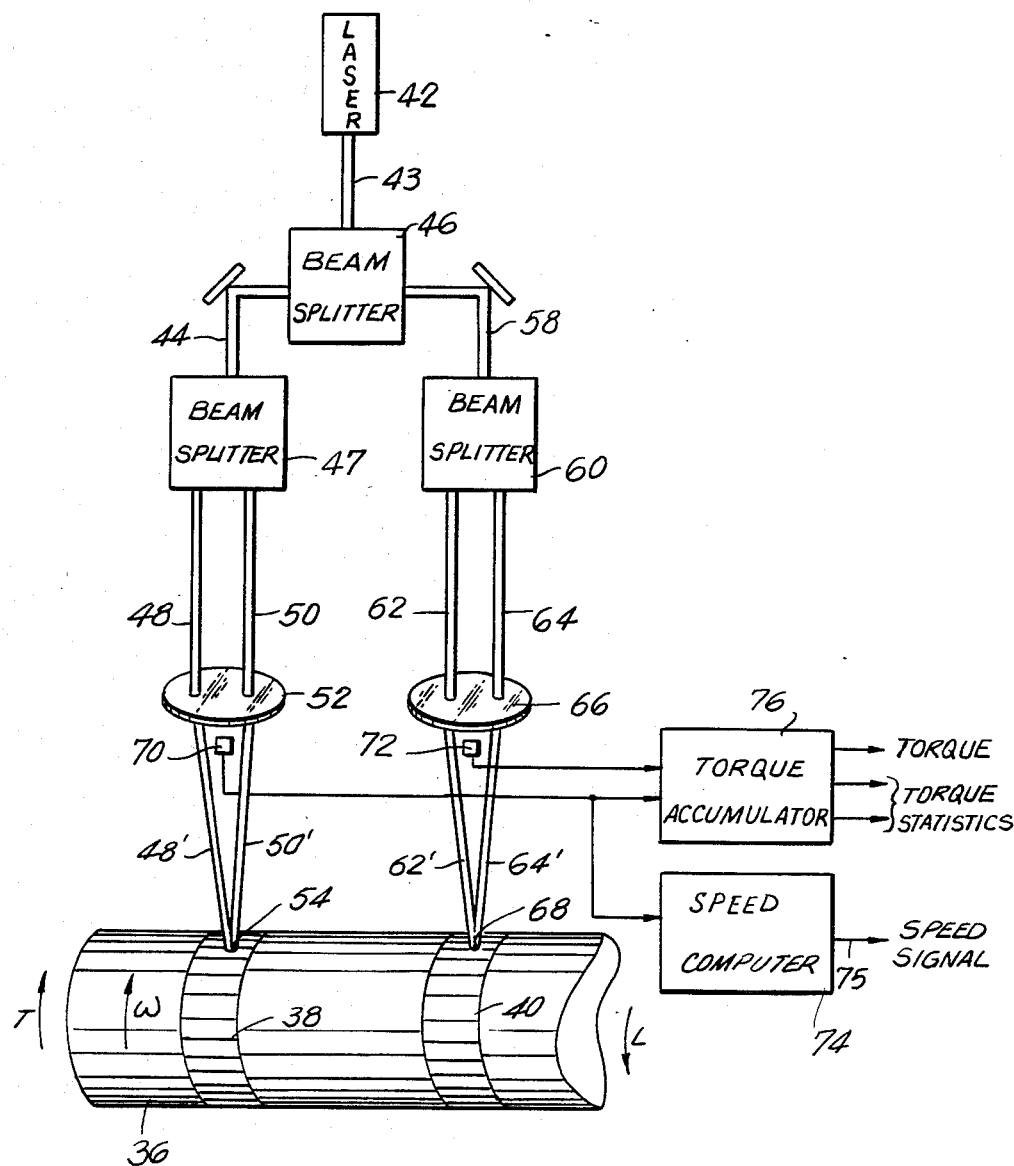
FIG. 3 illustrates a simplified perspective view and block diagram of a non-contact torque measurement apparatus according to an embodiment of the present invention.

Referring now to FIG. 3, a twist and torque measurement device according to the present invention may be employed in connection with a body such as, for example, a cylindrical shaft 36 to one end of which a torque T is applied and to the other end of which a resisting torque L is applied by a load. For purposes of illustration, but not as a necessity, shaft 36 may be rotated by torque T at a speed ω. A pair of diffraction gratings 38 and 40 encircle shaft 36. Diffraction gratings 38 and 40 have the same grating pitch which is preferably very fine. As shown, the grating lines are parallel to an axis of shaft 36. It is also within the contemplation of the invention that diffraction gratings 38 and 40 may also have lines in the tangential direction as well as in the axial direction. Tangential grating lines may be employed to measure axial motion of shaft 36 as fully disclosed in our prior referenced patent application.

A laser 42 produces a beam 43 of monochromatic light which may be of any convenient frequency or wave length including ultraviolet, visible and infrared. In the preferred embodiment of the invention, either red light from a helium neon laser or green light from an argon laser is employed. A beam splitter 46 breaks up beam 43 into two beams 44 and 58. A beam splitter 47 breaks beam 44 into two equal mutually coherent beams 48 and 50 which are parallel and appropriately spaced apart. A lens 52 produces refracted beams 48' and 50' which converge on a spot 54 on diffraction grating 38. Similarly, a beam splitter 60 splits beam 58 into a pair of parallel spaced apart beams 62 and 64 which are converged as beams 62' and 64' by a lens 66 on a spot 68 on diffraction grating 40. Spots 54 and 68 are axially spaced apart along shaft 36. If shaft 36 is twisted about its axis by load L, diffraction grating 40 tends to move a smaller distance under spot 68 than diffraction grating 38 moves under spot 54.

A detector 70 is appropriately positioned to intercept selected Bragg diffraction orders of spot 54 produced by beams 48' and 50'. Similarly a detector 72 is positioned to intercept the same Bragg diffraction orders from spot 68 produced by beams 62' and 64'.

The Doppler component in the signals from detectors 70 and 72 can be employed to determine the rotational speed ω of shaft 36. A speed computer 74 receives the output of detector 70 and produces the speed signal which is transmitted on a line 75 to external circuits or indicators.

The outputs of detectors 70 and 72 are applied to a torque accumulator 76 which essentially compares the Doppler signals generated by motion of diffraction gratings 38 and 40 and derives therefrom a value which indicates the twist which has been applied to shaft 36. For a given shaft, twist and torque are related in a known way so that torque itself can thereby be derived.

Although the preferred embodiment employs light from a single laser 42 split three times to produce two pairs of beams, it is equally within the contemplation of the present invention to employ separate lasers to produce beams 44 and 58 which may each thereupon be split into pairs of mutually coherent beams.

The greater the spacing between diffraction gratings 38 and 40, the greater sensitivity of the apparatus to twist. A resolution of from about 1 to about 10 microradians of twist can be detected. A total twist of as much as a few degrees may be experienced over a long shaft. In cases where access to shaft 36 is limited, a spacing of a few inches between diffraction gratings 38 and 40 may be sufficient.

Figure 4:
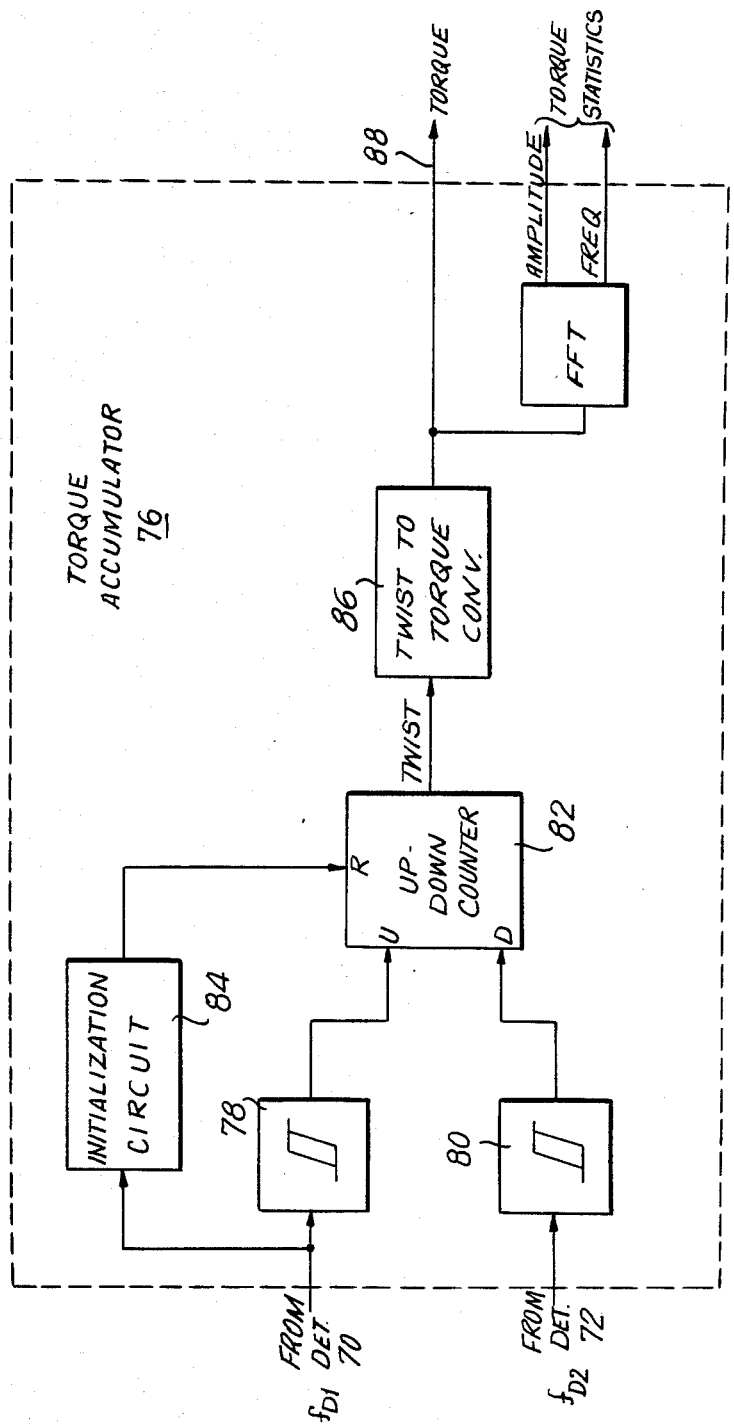
FIG. 4 is a simplified block diagram of a torque accumulator of FIG. 3.

Referring now to FIG. 4, torque accumulator 76 contains a Schmitt trigger 78 which receives the first Doppler frequency $f_{D1}$ from detector 70 which, as will be recalled, is closest to the source of torque T. A second Schmitt trigger 80 receives a second frequency $f_{D2}$ from detector 72 which is located closer to the load end of the shaft being measured. Schmitt triggers 78 and 80 serve as zero-crossing detectors for conditioning the essentially sine wave Doppler signals prior to their application to the up and down inputs respectively of an up-down counter 82. An initialization circuit 84 is optionally provided to reset or initialize up-down counter 82 at an appropriate time such as, for example, at a time when shaft 36 (FIG. 3) initially reaches operating speed.

In the absence of load, and with identical diffraction gratings 38 and 40 plus identical laser frequencies and angular relationships, Doppler frequencies $f_{D1}$ and $f_{D2}$ should be identical except for a possible constant phase offset. Thus, the outputs of Schmitt triggers 78 and 80, triggering up-down counter 82 to count up and down respectively, should maintain the same count in up-down counter 82 within one least significant bit. When load L is applied, however, shaft 36 tends to twist. Thus diffraction grating 40 is retarded slightly with respect to diffraction grating 38 and therefore the number of Doppler cycles triggering the two inputs of up-down counter 82 becomes unequal. Up-down counter 82 counts up or down from its initial condition an amount proportional to the load, the resilience of shaft 36 and the spacing between spots 54 and 68 at which the laser beams impinge on diffraction gratings 38 and 40.

The content of up-down counter 82 thus is proportional to the twist imparted to shaft 36 by load L. This value is applied to a twist to torque converter 86 which applies the above mentioned and other factors to the twist value to determine the existing value of torque. This value of torque may be applied on a line 88 to external circuits such as, for example, an alarm, recording device or indicator. The torque value may also be applied to a circuit which is capable of reducing the statistics of the torque for analysis or alarm purposes. For example, a fast Fourier transform circuit 90 may be employed to develop torque statistics such as, for example, the amplitudes and frequency contents of the torque oscillations.

From the above it is apparent that although the invention has been described hereinbefore with respect to certain specific embodiments and preferred illustrations, it is evident that many modifications and changes may be made without departing from the spirit of the invention. Accordingly, by the appended claims, we intend to cover all such modifications and changes as fall within the true spirit and scope of this invention.

We claim:

1. Apparatus for measuring twist in a body, said body being subjectable to a torque applied at a first location and said torque being resistable by a load at a second location, comprising:

first means for measuring a first velocity at a first region on a surface of said body;

second means for measuring a second velocity at a second region on a surface of said body;

said second region being closer to said load than said first region; and means for accumulating a difference between said first and second velocities, said difference being related to said twist.

2. Apparatus according to claim 1, wherein said first and second means each includes a periodic grating on said surface, a source of a beam of monochromatic light, means for splitting said beam into first and second components, means for impinging at least one of said first and second components on said region, means for detecting first light scattered from said periodic grating at an angle from said surface effective to intercept diffracted light at a predetermined diffraction order, and means for heterodyning said first light with light from the other of said first and second components whereby a Doppler frequency is generated by motion of said surface.

3. Apparatus according to claim 2, wherein said means for heterodyning includes means for impinging said first and second components on the same spot on said region with a predetermined angle between axes of said first and second components, and said means for detecting being positioned to intercept first diffracted light of one diffraction order from said first component and second diffracted light of another diffraction order from said second component.

4. Apparatus according to claim 3, wherein said first component is disposed at an angle of half said predetermined angle to one side of a normal to said surface at said spot and said second component is disposed at an angle of half said predetermined angle to an opposite side of said normal, whereby a zero diffraction order of each of said first and second components lies along the other thereof.

5. Apparatus according to claim 1, wherein said first means for measuring is effective to produce first cycles of a first Doppler frequency, said second means for measuring is effective to produce second cycles of a second Doppler frequency, and said means for accumulating is effective to accumulate a difference between a number of said first and second cycles.

6. Apparatus according to claim 1, further comprising means responsive to said difference for calculating a torque on said body.

7. Apparatus for measuring twist in a substantially cylindrical shaft having an axis, said shaft being subjectable to a torque about said axis at a first end thereof and subjectable to a load resisting said torque at a second end thereof, comprising:
  a first diffraction grating forming a first band about said shaft;
  a second diffraction grating forming a second band about said shaft;
  said first and second diffraction gratings having equally spaced parallel grating lines disposed parallel to said axis;
  said second diffraction grating being axially spaced a predetermined distance along said shaft from said first diffraction grating;
  means for forming a first beam of monochromatic light;
  means for splitting said first beam into second and third spaced apart beams of monochromatic light;
  means for converging said second and third beams on a single first spot on said first diffraction grating;
  said second and third beams defining a plane normal to said axis;
  first means for simultaneously detecting at least one diffraction order from said second beam and at least another diffraction order from said third beam;
  said first means for simultaneously detecting being effective to produce first cycles of a first Doppler frequency related to motion of said first diffraction grating;
  means for forming a fourth beam of monochromatic light;
  means for splitting said fourth beam into fifth and sixth spaced apart beams of monochromatic light;
  means for converging said fifth and sixth beams on a single second spot on said second diffraction grating;
  said fifth and sixth beams defining a plane normal to said axis;
  second means for simultaneously detecting at least said one diffraction order from said fifth beam and said at least another diffraction order from said sixth beam;
  said second means for simultaneously detecting being effective to produce second cycles of a second Doppler frequency related to motion of said second diffraction grating; and
  means for accumulating a difference between said first cycles and said second cycles, said difference being related to a twist in said shaft.

8. Apparatus according to claim 7, further comprising means responsive to said difference for calculating said load.

9. Apparatus according to claim 8, further comprising means responsive to said difference for calculating statistics related to variations in said load.

10. A method of measuring a torque applied to a body, comprising:
  measuring a first Doppler frequency derived from motion of a first point on said body;
  measuring a second Doppler frequency derived from motion of a second point on said body, said second point being spaced from said first point;
  accumulating a difference between said first and second Doppler frequencies; and
  interpreting said difference in terms of torque.

11. A method according to claim 10, further comprising calculating statistics of said torque.

12. A method of measuring a load applied to a first end of a substantially cylindrical shaft having a torque applied to a second end thereof, comprising:
  measuring a first Doppler frequency derived from motion of a surface of said shaft at a first axial position;
  measuring a second Doppler frequency derived from motion of a surface of said at a second axial position spaced apart from said first axial position;
  accumulating a difference between said first and second Doppler frequencies; and
  interpreting said difference in terms of torque.

* * * * *